(12) United States Patent
Sumida

(10) Patent No.: US 7,295,580 B2
(45) Date of Patent: Nov. 13, 2007

(54) NUMERICAL APERTURE OPTIMIZATION USING DOPED CLADDING LAYERS

(75) Inventor: David S. Sumida, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 345 days.

(21) Appl. No.: 10/846,146

(22) Filed: May 14, 2004

(65) Prior Publication Data

US 2005/0008051 A1 Jan. 13, 2005

Related U.S. Application Data

(60) Provisional application No. 60/471,292, filed on May 15, 2003.

(51) Int. Cl.
*H01S 3/30* (2006.01)
(52) U.S. Cl. ............................................. 372/6; 372/64
(58) Field of Classification Search ..................... 372/6
See application file for complete search history.

(56) References Cited

U.S. PATENT DOCUMENTS

| | | | | |
|---|---|---|---|---|
| 4,815,079 A * | 3/1989 | Snitzer et al. | ................... | 372/6 |
| 5,048,026 A | 9/1991 | Shaw et al. | ................... | 372/6 |
| 5,852,622 A | 12/1998 | Meissner et al. | ............. | 372/39 |
| 5,936,984 A | 8/1999 | Meissner et al. | ............. | 372/34 |
| 6,055,260 A | 4/2000 | Bryen et al. | ................... | 372/72 |
| 6,160,824 A | 12/2000 | Meissner et al. | ............... | 372/7 |
| 6,288,833 B1 | 9/2001 | Kasamatsu | ................... | 359/333 |
| 6,324,326 B1 | 11/2001 | Dejneka et al. | ............. | 385/123 |
| 6,738,396 B2 * | 5/2004 | Filgas et al. | ................... | 372/19 |
| 2003/0012534 A1* | 1/2003 | Sumida et al. | ............. | 385/123 |
| 2003/0138021 A1* | 7/2003 | Hodgson et al. | ............. | 372/75 |
| 2004/0076197 A1* | 4/2004 | Clarkson et al. | ................ | 372/6 |
| 2005/0008044 A1* | 1/2005 | Fermann et al. | ............. | 372/19 |

FOREIGN PATENT DOCUMENTS

| EP | 0 801 449 A2 | 10/1997 |
|---|---|---|
| WO | 01/24325 A1 | 4/2001 |

OTHER PUBLICATIONS

Chai, B.H.T. "Optical Crystals," *CRC Handbook of Laser Science and Technology*, Supplement 2: Optical Materials, M.H. Weber, ed. p. 34 (1995).
Levin, E. M. "Refractivities of the Rare Earth Oxides," *3rd Rare Earth Conference*, pp. 339-350 (Apr. 1963).
McClure, D.S. "Optical Spectra of Transition-Metal Ions in Corundum," *The Journal of Chemical Physics*, vol. 36, No. 10 p. 2757, 1962.

(Continued)

*Primary Examiner*—Dung T. Nguyen
(74) *Attorney, Agent, or Firm*—Ladas & Parry

(57) ABSTRACT

A method and apparatus for optimizing the numerical aperture (NA) of a laser active core. The laser active core comprises at least a first and second cladding pair. The first and second cladding pair have at least one NA value. At least one of the first and second cladding pair is doped with a dopant to change the first NA value to a second NA value.

46 Claims, 7 Drawing Sheets

OTHER PUBLICATIONS

Sumida, D., et al., "Diode-pumped Yb:YAG catches up with Nd:YAG," *Laser Focus World,* 4 pages (Jun. 1999).

Sumida, D., et al., "Spectroscopy and Diode-Pumped Lasing of $Yb^{3}$+-Doped $Lu_3Al_0O_{12}$ (Yb:LuAG)," *OSA Proceedings on Advanced Solid-State Lasers,* vol. 24, B. Chai and S. Payne, eds., pp. 348-350 (1995).

Yumashev, K.V., et al., "Nonlinear absorption properties of $CO^{2}$+ : $MgAl_2O_4$ crystal," *Applied Physics B,* vol. 70, pp. 179-184 (2000).

* cited by examiner

NUMERICAL APERTURE OPTIMIZATION USING DOPED CLADDING LAYERS

CROSS-REFERENCE TO RELATED APPLICATIONS

The present application is related to and claims the benefit of co-pending U.S. Provisional Patent Application Ser. No. 60/471,292, filed on May 15, 2003 and titled "Numerical Aperture Optimization Using Doped Cladding Layers." The disclosure of U.S. Provisional Patent Application No. 60/471,292 is incorporated herein by reference in its entirety.

The present application is also related to the commonly assigned patent application document entitled "Guided-mode laser apparatus with improved cladding structure and a method of fabricating thereof", U.S. Ser. No. 09/894,347, filed on Jun. 28, 2001. The disclosure of this related application is incorporated herein by reference in its entirety.

STATEMENT OF GOVERNMENT INTEREST

This invention was made with U.S. Government support under U.S. Government subcontract S7-6AP118X62A9 to a prime contract NBCHO10025 from the U.S. Department of Defense. Pursuant to those contracts, the U.S. Government may have certain rights in the invention.

FIELD

The present disclosure teaches a method and apparatus for optimizing the numerical aperture (NA) of a laser-active core medium within a composite guided-wave solid-state laser device or optical fiber.

BACKGROUND

Optimizing the NA for guided wave laser devices (oscillators and amplifiers) provides several advantages. First, because the optical pump source and signal beams must be guided within the core of the guided wave laser device, the NA must be large enough to accommodate both sets of beams within the core without loss. Typically, a pump source will emit optical energy into the laser active core of a waveguide structure. In response, ions in the core will fluoresce and emit another optical signal. At the same time, an oscillator or other device will emit a signal beam into the core of the waveguide structure. The signal beam is then amplified by the optical signal resulting from the fluorescing ions in the core. To maximize amplification, the wavelength of the signal beam is preferably matched to the wavelength of the optical signal resulting from the fluorescing ions. However, the NA must not be too large, otherwise more amplified spontaneous emission (ASE) is trapped and the likelihood of parasitic oscillations increases. By allowing the maximum amount of ASE to escape from the core (i.e., those ASE rays beyond the solid angle defined by the optimized NA), a relatively higher degree of gain is attainable. This is especially important for high-gain amplifier devices, in that a higher gain is sustainable than would otherwise be the case if non-optimized cladding or air were used to surround the core.

It is also important to address the ASE rays that do enter the cladding, and implement ways to prevent them from reentering the core region, thereby further enhancing the gain within the core. These ways include (1) adding appropriate dopant(s) within the cladding layers (ideally the same dopant as for the optimized NA) to absorb the ASE within the bulk of the cladding, (2) fine grinding the outer surface of the cladding to scatter ASE, (3) adding an absorptive layer on the outer surface of the cladding, and (4) incorporating scattering sites within the cladding host itself.

The prior art for optimizing the NA of guided wave composite solid-state laser devices generally comprises two cases, where, in both cases, the cladding is assumed to be diffusion bondable to the core in question. For the two cases of prior art, either the NA is uniquely determined by a given undoped cladding material, or non-lasing dopants are added to the core itself to increase the core's refractive index and thereby alter the NA.

In the first case, these claddings are typically either composed of the undoped core material or an undoped medium of a similar chemical composition so that a good quality diffusion bond is assured. For the undoped core material as the cladding layer, the general supposition is that the refractive index will decrease when the laser active ion is removed from the crystalline medium to be replaced by the stoichiometric ion of the host. However, in many cases the resulting NA is too small to support either the pump or the signal or both because the change in refractive index for the undoped medium is quite small (nominally $10^{-3}$ to $10^{-4}$ per at. %), given that the typical doping level for a laser medium is on the order of 1 at. %. Hence, the difference in refractive index between the doped and undoped material is on the order of $10^{-3}$ to $10^{-4}$ which is usually not large enough to provide an adequate NA for guiding.

For the specific case of a 1% Yb:YAG core, the NA is too small when undoped YAG is utilized as the cladding medium. Of course, the actual NA will depend on the initial doping level of the laser active core in question. As a result, one disadvantage of using undoped cladding material of the same stoichiometry as the core is that the NA is generally too small to be useful. Another disadvantage of the undoped cladding approach is that even if the NA is appropriate for a given laser architecture, it is a point design. In the event that the parameters of the pump or signal beams change, or the ASE suppression needs to be enhanced, the undoped cladding material may not be able to address these issues. Yet another disadvantage results when the undoped cladding material comprises a different material than the core. In such a situation, the NA may be too large, and is completely dependent on whether a fortuitous match is found between a given core and cladding. In that case, the ASE and parasitic oscillations may degrade the laser performance and even lead to optical damage of the guided wave composite.

For the other case in which a non-lasing dopant is added to the core, it is preferable that the additional dopant or dopants not affect the laser performance in terms of introducing absorption at the pump or signal wavelength. It is important to note the distinction between the deleterious effect of absorption by such additional dopant(s) in the core, versus the beneficial advantage of that same absorption by the same dopant(s) in the cladding that suppresses ASE. Another constraint is the ability to introduce a dopant(s) in the crystal growth process for the core without negatively affecting the growth of the active laser medium.

SUMMARY

Embodiments of the present invention provide a method and apparatus for optimizing the NA of a laser active core in a guided wave structure. The ability to optimize the NA of the core is accomplished by a prudent search for dopants and cladding layer materials that are compatible over a wide number of parameters. Among these parameters are diffusion bondability, isotropic symmetry, and realizable crystal growth over a range of doping levels.

One embodiment of the present invention provides a laser active core comprising a first and second cladding pair and having a first NA value and doping at least one of the first and second cladding pair with a dopant, wherein the step of doping changes the first NA value to a second NA value.

Another embodiment of the present invention is a method for optimizing a NA value of a laser active core comprising: providing a laser active core having a first and second cladding pair, a first and second face, and having a first NA value, wherein the first and second cladding pair are bonded to the laser active core, and wherein providing the laser active core further comprises the steps of providing endcaps diffusion bonded across the first and second faces and across the portion of the first and second cladding pair planar with the first and second faces; and doping at least one of the first and second cladding pair with a dopant, wherein the step of doping changes the first NA value to a desired second NA value.

Still another embodiment of the present invention comprises the steps of providing a laser active core, the laser active core comprising a first and second cladding pair and having a first NA value, selecting a dopant, and doping at least one of the first and second cladding pair with the dopant, wherein the step of doping changes the first NA value to a desired second NA value, and wherein the step of selecting comprises the step of selecting a dopant which is chemically compatible with at least one parameter of the first and second cladding pair, and wherein the step of doping comprises the step of determining an appropriate doping concentration that will provide the desired second NA value.

DETAILED DESCRIPTION

The present invention will now be described more fully hereinafter with reference to the accompanying drawings, in which preferred embodiments of the invention are shown. This invention may be embodied in many different forms and should not be construed as limited to the embodiments set forth herein.

The present invention provides a method and apparatus for varying the NA of a laser active core in a composite guided-wave structure, such as a rectangular dielectric waveguide, by tailoring the refractive index of the cladding layers surrounding the laser active core. The ability to tailor the NA of a laser active core in a guided-wave structure allows the etendue of the laser active core to more closely match the etendue of an optical pump source emitting optical energy into the guided-wave structure. This results in more of the optical energy being captured by the laser active core, which is desirable since the optical energy from the optical pump source will eventually be used to amplify a signal beam in the laser active core, for example. Etendue is defined as the product of the numerical aperture and the diameter of the source transmitting or receiving the optical energy. Typically, the intensity pattern of optical energy in a signal beam emitted from an oscillator is circular, while optical energy emitted from an optical pump source typically has a more elliptic shape. For this reason, it is useful to define the etendue in both an x-direction and a y-direction. Because the etendue of a given optical pump source is fixed by the manufacturer and the core diameter of a guided-wave structure is constrained due to laser efficiency reasons known to those skilled in the art, typically only the NA of the guided-wave structure can be adjusted to more closely match the etendue of the optical pump source. Described below is a method for tailoring the NA in either the x-direction or y-direction.

Figure 1B:
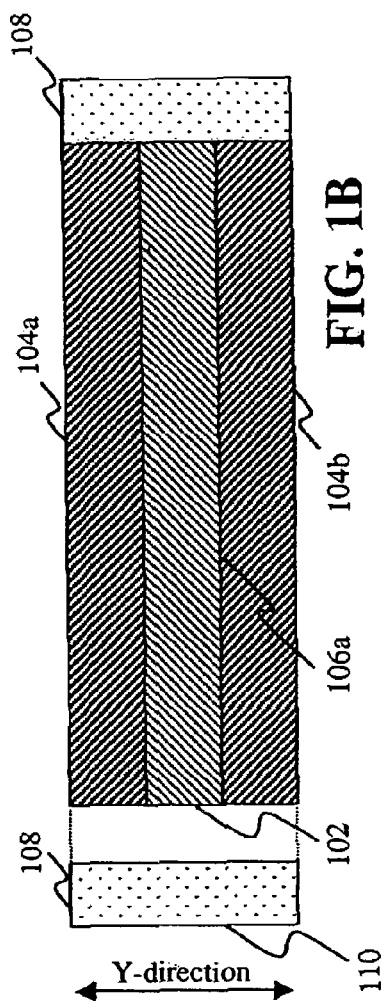
FIG. 1B depicts a side view of the composite waveguide structure shown in FIG. 1A.
Figure 1C:
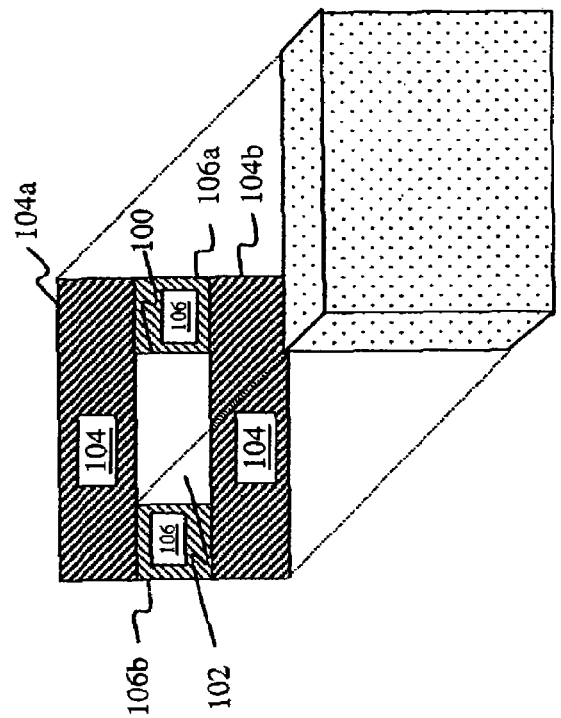
FIG. 1C depicts an expanded 3-dimensional view of the waveguide structure shown in FIGS. 1A and 1B.
Figure 1A:
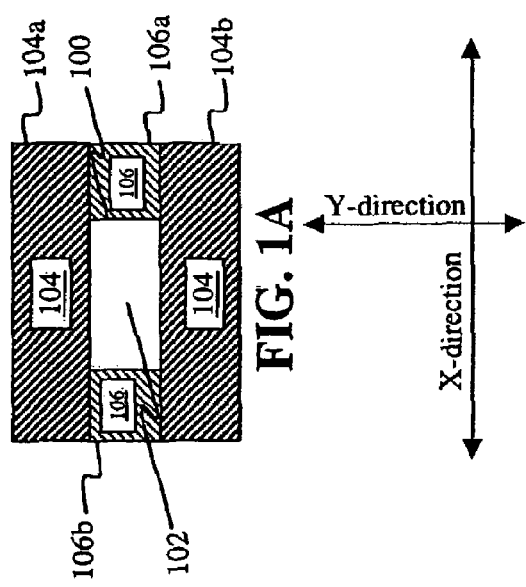
FIG. 1A depicts a front view of a composite waveguide structure according to an embodiment of the present invention.

Shown in FIGS. 1A and 1B are front and side views, respectively, of a rectangular dielectric waveguide structure with no specific cladding materials yet defined. The waveguide comprises a laser active core 100, preferably of a square or rectangular shape, having two faces 102. The laser active core 100 is surrounded by a first cladding pair 104 comprising a first cladding layer 104a and second cladding layer 104b. The laser active core 100 is also surrounded by a second cladding pair 106 comprising a first and second side cladding layer 106a, 106b. The first and second cladding pair 104, 106 may be diffusion bonded to the laser active core 100, however those skilled in the art will realize that a variety of bonding techniques may be used. The first cladding pair 104 determines the NA in the y-direction, and the second cladding pair 106 determines the NA in the x-direction. The first and second cladding pair 104, 106 may or may not comprise the same material. As shown in FIG. 1C, endcaps 108, preferably undoped, are bonded to the faces 102 of the laser active core 100 and to the portion of the first and second cladding pairs 104, 106 that are planar with the faces 102.

An exemplary situation will now be discussed to illustrate the process of determining which materials and/or dopants may be used in the first cladding pair 104 and/or second cladding pair 106 to tailor the NA. In this exemplary situation, the core 100 comprises 1% Yb:YAG, and has an index of refraction (n) of 1.82017 at a wavelength of 1.03 μm. The endcaps 108 preferably comprise YAG, however, other dissimilar materials may be used equally as well. If other materials are used for the endcaps 108, the material is typically the same as that of the base material used for the core 100. In determining which materials may be used for the first and second cladding pairs 104, 106, several considerations are made.

A first consideration is that the first cladding pair 104 should have high thermal conductivity since the desired heat flow in the laser active core 100 is one-dimensional, which helps to minimize thermal birefringence and simplify thermal lensing effects. A second consideration is that the first and second cladding pair 104, 106 should exhibit reasonable strength relative to the laser active core 100. Thermal effects may cause the core to bulge or expand out due to tensile stress. If the first and second cladding pair 104, 106 can exhibit sufficient strength and provide a compressive stress to counterbalance the tensile stress, the core will be prevented from bulging or expanding in these directions. A third consideration is that the endcaps 108 should be capable of being bonded across the faces 102 of the laser active core 100 and the portion of the first and second cladding pair 104, 106 planar with the faces 102. As aforementioned, the endcaps 108 preferably comprise YAG. YAG is laser inactive and so is not directly heated, which will help prevent the faces 102 from expanding or bulging. Also, the presence of endcaps 108 will help reduce the risk of optical damage to the laser active core 100. The endcaps 108 help the pump and signal beams to spatially expand from the face 102 of the laser active core 100 thereby reducing the intensity on any anti-reflection coatings. If used, the anti-reflection coatings are located on the exposed surface 110 of the endcaps 108 parallel to the faces 102. They typically comprise multiple layers of a dielectric material. The dielectric material may comprise dielectric materials known in the art. The endcaps 108 also serve to strengthen the region of the laser active core 100 around the faces 102 against thermo-mechanically induced problems by transforming the prior unconstrained tensile stress into a confined compressive stress in that region of the laser active core 100.

Given the above-mentioned considerations, Table 1 depicts a sampling of possible candidates, after an exhaustive search for materials, that may be used in the first and second cladding pairs. This list is by no means complete, but is merely used for exemplary purposes only. Those skilled in the art will realize that there are a variety of single crystal, poly crystal, or glasses, which may be used. As can be seen in Table 1, several of the candidates, such as $ZnAl_2O_4$ (Gahnite), $Mg_3Al_2Si_3O_{12}$ (Pyrope), $Ca_3Al_2Si_3O_{12}$ (Grossularite), and $Ca_3Al_2Ge_3O_{12}$, are difficult to grow as single crystal and thus may be less desirable candidates. Of the other candidates, $Lu_3Al_5O_{12}$ (LuAG) and $MaGa_2O_4$ have a refractive index above that of 1% Yb:YAG core material at a wavelength of 1.03 μm. As a result, these materials may also be less desirable candidates for the first and second cladding pair 104, 106. In general, the material of interest should have a refractive index less than the core at the wavelength of interest. Although the refractive index of these materials at 1 μm are compared with the refractive index of 1% Yb:YAG at 1.03 μm, the difference between 1.0 μm and 1.03 μm is too small to make a difference in the comparison.

TABLE 1

| Material | Structure | Refractive index | Wavelength μm | Issue |
|---|---|---|---|---|
| YAG $Y_3Al_5O_{12}$ | cubic | 1.82 | 1 | NA too small |
| LuAG $Lu_3Al_5O_{12}$ | cubic | 1.83 | 1 | n too high |

TABLE 1-continued

| Material | Structure | Refractive index | Wavelength μm | Issue |
|---|---|---|---|---|
| Sapphire $Al_2O_3$ | uniaxial | 1.752 average | 1 | c-axis makes diffusion bonding difficult for certain orientations |
| Spinel $MgAl_2O_4$ | cubic | 1.7 | 1 | NA too large |
| Gahnite $ZnAl_2O_4$ | cubic | 1.78 | 1 | Not congruent growth |
| $MaGa_2O_4$ | cubic | 1.879 | visible | n too high |
| Pyrope $Mg_3Al_2Si_3O_{12}$ | cubic | 1.713 | visible | difficult growth |
| Grossularite $Ca_3Al_2Si_3O_{12}$ | cubic | 1.734 | visible | difficult growth |
| $Ca_3Al_2Ge_3O_{12}$ | cubic | | | difficult growth |
| ALON | cubic | 1.776 | 1 | |

Figure 2:
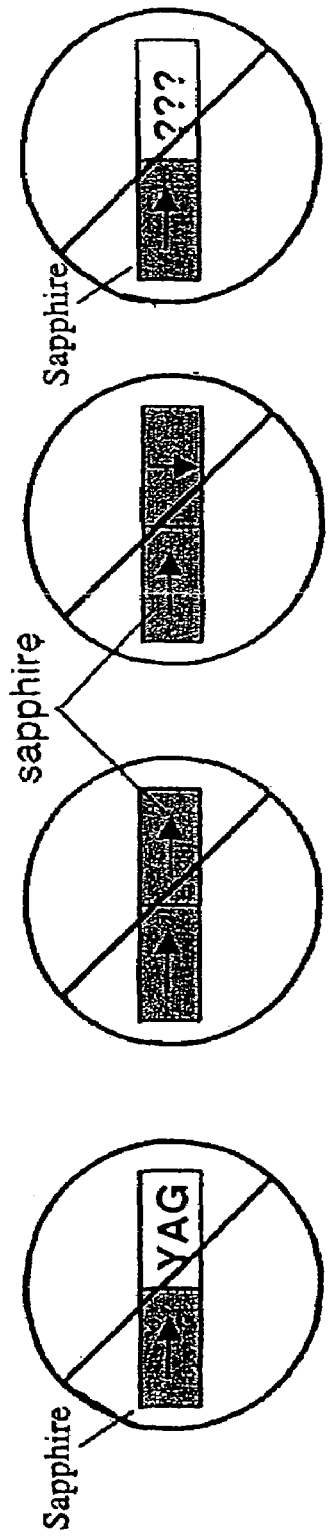
FIG. 2 depicts impractical bonding orientations of sapphire.
Figure 3:
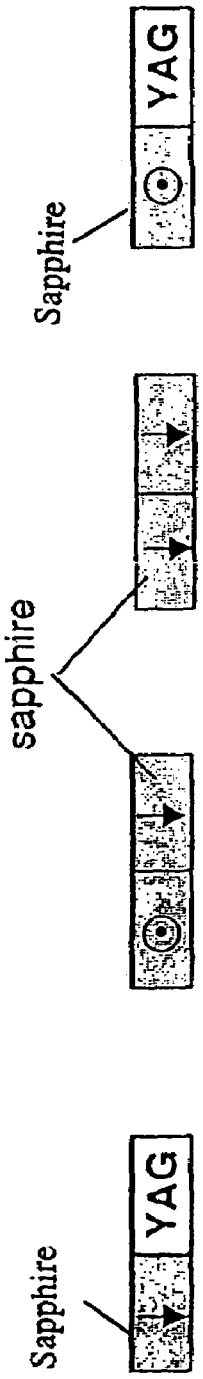
FIG. 3 depicts acceptable bonding orientations of sapphire.

Based on the aforementioned considerations and the remaining materials that may be used, sapphire may be considered for the first cladding pair 104 due to its superior thermal conductivity and mechanical strength. However, sapphire is not an isotropic crystalline structure (e.g. sapphire is a uniaxial structure) which imposes fabrication restrictions on how the sapphire must be orientated in order to bond with the core 100. This restriction arises because sapphire does not polish easily in a plane normal to its c-axis. As a result, those skilled in the art will realize that bonding any material to a surface perpendicular to the c-axis of sapphire is not preferred, as depicted in FIG. 2. Hence, the sapphire c-axis is preferably orientated in a manner as shown in FIG. 3 in order for the endcaps 108 to bond with sapphire. This orientation of sapphire places a further limitation in that the sapphire is preferably not used for the second cladding pair 106. No matter how the c-axis is orientated (i.e., the c-axis is perpendicular to the first cladding pair 104, perpendicular to the laser active core 100, or perpendicular to the endcaps 108), none of these orientations is preferred. As a result, another cladding material should be selected for the second cladding pair 106 so that the endcaps 108 may be successfully diffusion bonded across the faces 102 and the first and second cladding pairs 104, 106.

YAG, $MgAl_2O_4$ (spinel), and ALON are the remaining elements of Table 1 that may be considered for the second cladding pair 106. Given these materials, another consideration is whether their NA is sufficient for the application in which they are to be used. An NA on the order of 0.27 is desirable for use with current state-of-the-art beam divergence aperture product values for high power laser diode pump arrays. The material should also be able to diffusion bond with the first cladding pair 104 and the endcaps 108 (i.e., sapphire and YAG). Spinel is the most likely to meet these criteria as reports from Onyx Optics indicate that the material can be diffusion bonded to YAG. Also, the crystal structure of spinel is isotropic, hence there is no issue with orientation in bonding the second cladding pair 106 to the laser active core 100. Spinel does provide a NA of approximately 0.64 with YAG, which is significantly higher than 0.27 for use in current state-of-the-art devices. As a result, the use of spinel may support more ASE and parasitics than if the spinel were tailored to provide a NA that more nearly matches the NA of current state-of-the-art devices (i.e., 0.27 for the laser diode pump array mentioned above). Of course, those skilled in the art will realize that spinel may also be used in the first cladding pair 104 instead of sapphire.

Figure 4:
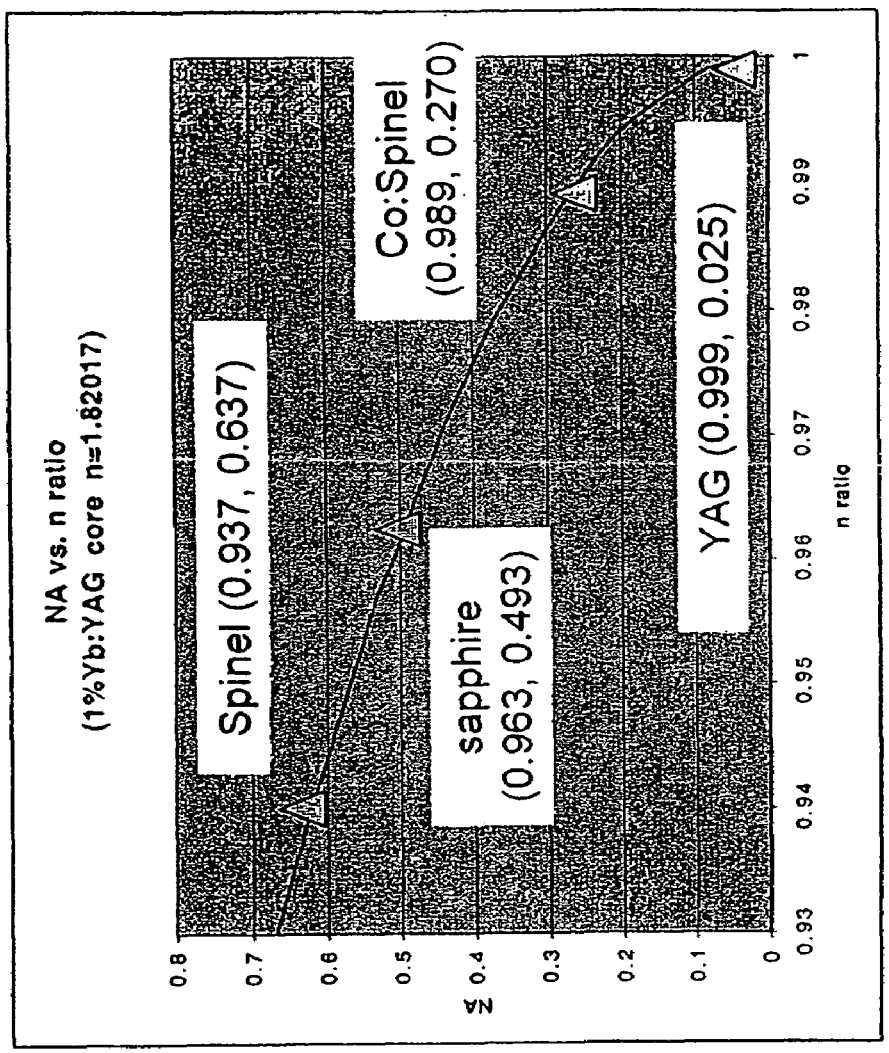
FIG. 4 depicts a graph showing the relationship between numerical aperture (NA) and the ratio of n of the cladding material and the n of the core.

It has been found that when a dopant is introduced into spinel, its refractive index can be adjusted. Shown in FIG. 4 is a graph illustrating the relationship between the NA values and the ratio of the refractive indices of several candidate cladding materials to the 1% Yb:YAG core 100. The two numbers in the parentheses show the refractive index ratio and NA value, respectively, for each cladding material. As can be seen in the graph, cobalt-doped spinel provides the desired NA of approximately 0.27 for the case discussed above. It can be easily deduced that the required refractive index of the cobalt-doped spinel is approximately 1.8, as compared to the undoped refractive index of spinel, which is about 1.7. The use of cobalt as a dopant to increase the refractive index of spinel is not arbitrary, as will be discussed below. It should be noted, that in this exemplary embodiment, tailoring the NA of the side cladding pair 106 will adjust the etendue in the x-direction.

Once a candidate for the cladding material is chosen, in this case spinel, a determination is made as to whether the refractive index of the cladding material should be increased or decreased in order to adjust the NA accordingly. In this case, it is desired to increase the refractive index to about 1.8. To determine a suitable dopant for increasing the refractive index, several parameters of the cladding material (spinel) are determined. These parameters include the site symmetry, ionic radius, and valence of possible dopant sites within the cladding material. Given these parameters, the next step is to determine which ionic dopants will fit into the specific site of the cladding material and have a significant impact on the refractive index of the cladding.

For the case of spinel, the relevant dopant site contains the Mg ion whose ionic size, coordination number, and valence are 0.57 Å, IV, and $2^+$, respectively. The suitable dopant candidate must be well matched to the parameters of the Mg ion in order to maintain a high-quality cladding material. A list of possible dopant materials is listed in Table 2. Of course, this list is by no means complete, but merely provided for exemplary purposes.

TABLE 2

| Dopant | Coordination number | Ionic radius, Å |
|---|---|---|
| $Mg^{2+}$ | IV | 0.57 |
| $Co^{2+}$ | IV | 0.58 |
| $Ni^{2+}$ | IV | 0.55 |
| $Zn^{2+}$ | IV | 0.6 |
| $Mn^{2+}$ | IV | 0.66 |
| $Cd^{2+}$ | IV | 0.78 |

Figure 5:
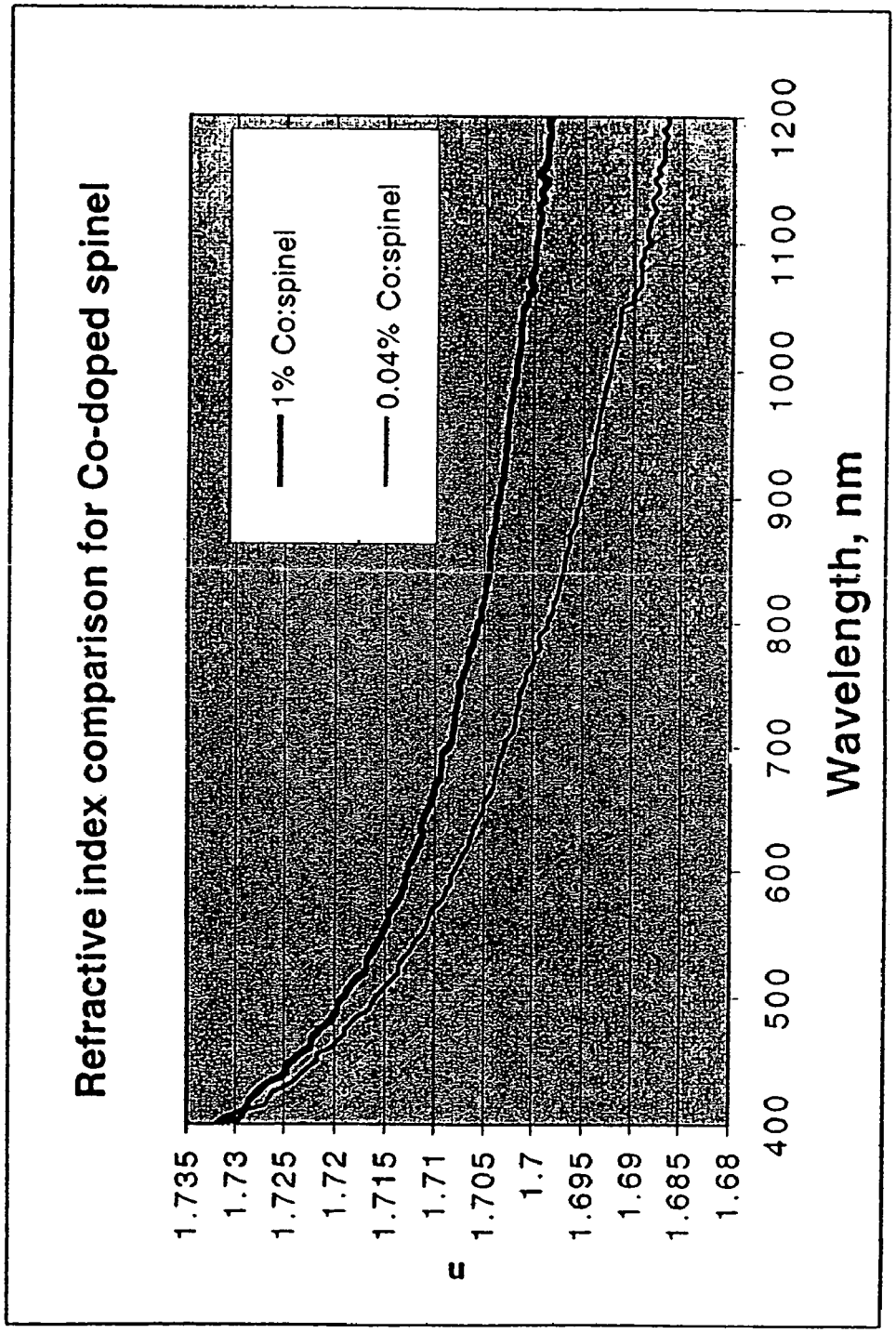
FIG. 5 depicts an experimentally determined graph showing the relationship between refractive index and wavelength for spinel with different doping concentrations.

Of these materials, cobalt ($Co^{2+}$) is most nearly matched to the Mg ion, and thus the most suitable for the specific case of spinel. Shown in FIG. 5 is a graph depicting how the experimentally measured refractive index n of the cobalt doped spinel changes as a function of wavelength at room temperature for cobalt dopant levels of 0.04 atomic % (at. %) and 1 at. %. The graph shows that the higher doped Spinel has a higher refractive index n for a given wavelength. From this graph, the measured rate of change of n relative to the cobalt doping level can be calculated to be about 0.01 per at. % Cobalt. Hence, for the desired index of refraction of 1.8 at 1 μm, which yields a NA of 0.27, a required doping level of approximately 10 at. % Co is required.

The values for the refractive index in the graph shown in FIG. 5 can also be calculated using what is known as the rule of Gladstone and Dale as discussed in E. M. Levin, "Refractivities of Rare Earth Oxides", $3^{rd}$ Rare Earth Conference, April 1963, in which the concept of refractivity can be employed to calculate the refractive index of a doped cladding material (in this case, spinel). There are two equations for refractivity as shown in Eq. 1 and Eq. 2. In Eq. 1, the definition for the refractivity is the refractive index (n) minus unity, divided by the density (p). The density of spinel used in Eq. 1 is 3.58 gm/cc and was taken from B. H. T. Chai, "Optical Crystals," CRC Handbook of Laser Science and Technology, Supplement 2: Optical Materials, M. H. Weber, ed. (CRC Press, 1995) p. 34. In Eq. 2, the calculated refractivity for a given material is defined to be the sum of the products of the weight fraction ($p_i$) of the components times their respective refractivities ($r_i$).

$$r = \frac{(n-1)}{\rho} \quad \text{Eq. 1}$$

$$R = \sum_i p_i r_i \quad \text{Eq. 2}$$

For example, in the case of spinel at $MgAl_2O_4$, the values for $p_i$ and $r_i$ are depicted in Table 3 below, where the components of spinel are divided into MgO and $Al_2O_3$ in equal proportion. The value of $r_i$ for MgO and $Al_2O_3$ was determined using Eq. 1 and known values for the refractive index and density of MgO and $Al_2O_3$. As shown in Table 3, the value of $p_i r_i$ for MgO is 0.0529 and the value of $p_i r_i$ for $Al_2O_3$ is 0.1462. The values for $r_i$ vary depend on wavelength. For this example, a wavelength of 589 nm was assumed, yielding the values for $r_i$ shown in Table 3. Other values for $r_i$ at different wavelengths are readily available. These values of $p_i r_i$ sum to 0.1991 which is the value of R. This value for R can then be inserted into Eq. 1, where the refractive index (n) can be calculated to equal 1.7127. This calculated refractive index value for spinel is in good agreement with the experimentally measured value of ~1.71 for 0.04% Co doped Spinel at 589 nm in the graph depicted in FIG. 5. Although, the calculated refractive index value did not take into account a cobalt dopant, as did the experimental graph in FIG. 5, a dopant concentration of 0.04% at. is low enough to be compared with non-doped spinel.

TABLE 3

| Starting Material | Compositional mixture | Molecular weight | Weight fraction, $p_i$ | Refractivity, $r_i$ | $p_i r_i$ |
|---|---|---|---|---|---|
| MgO | 1 | 40.3 | 0.2833 | 0.1866 | 0.0529 |
| $Al_2O_3$ | 1 | 101.96 | 0.7167 | 0.204 | 0.1462 |

In order to determine the refractive index of an arbitrarily doped cladding material as a function of its doping level, the above described equations for finding refractivity can be extended to incorporate a dopant. To do this, the refractive index and density of the dopant must be known. These values are readily available in the literature. Furthermore, the density of 100 at. % doped cladding material should also be known in order to appropriately scale the density of the partially doped cladding material as a function of doping, given the assumption that the density of the doped cladding material changes proportionally with the level of doping. Given these values, the refractive index of the doped cladding material can be calculated, and will be described below using the example of cobalt-doped spinel.

To determine the refractive index change as a function of doping for Co-doped spinel, the refractivity values must be determined for CoO. The refractive index for CoO is known to vary between 2.0 and 2.6. Furthermore, the density of CoO is known to vary between 5.65 gm/cc and 6.45 gm/cc. If the spinel is partially doped with cobalt, then the values for the density, molecular weight, and weight fraction would be based on a compound of the form $Co_xMg_{1-x}Al_2O_4$, where x is the doping fraction.

Figure 6:
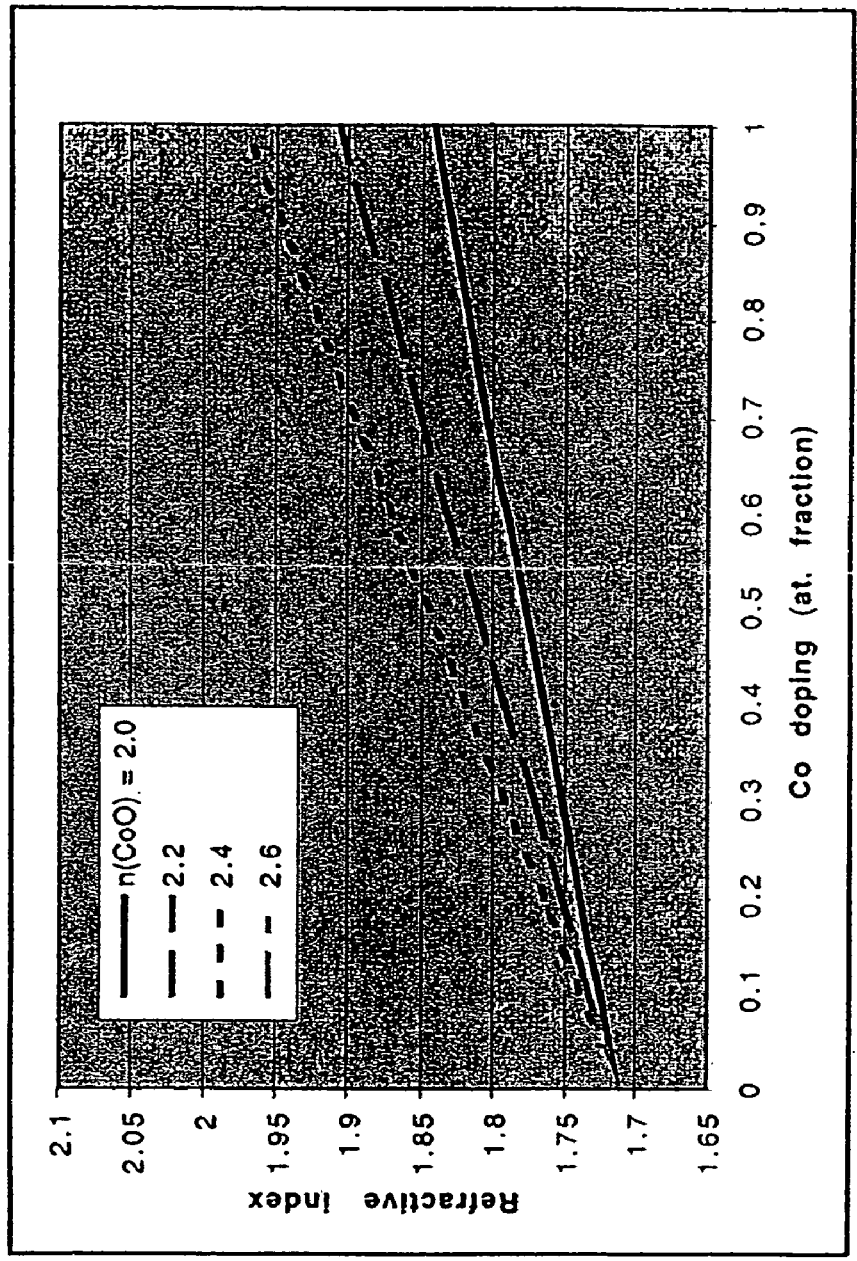
FIG. 6 depicts a calculated graph showing the relationship between refractive index and cobalt doped spinel for a range of refractive index values and an estimated density value of 5.65 gm/cc for CoO.
Figure 7:
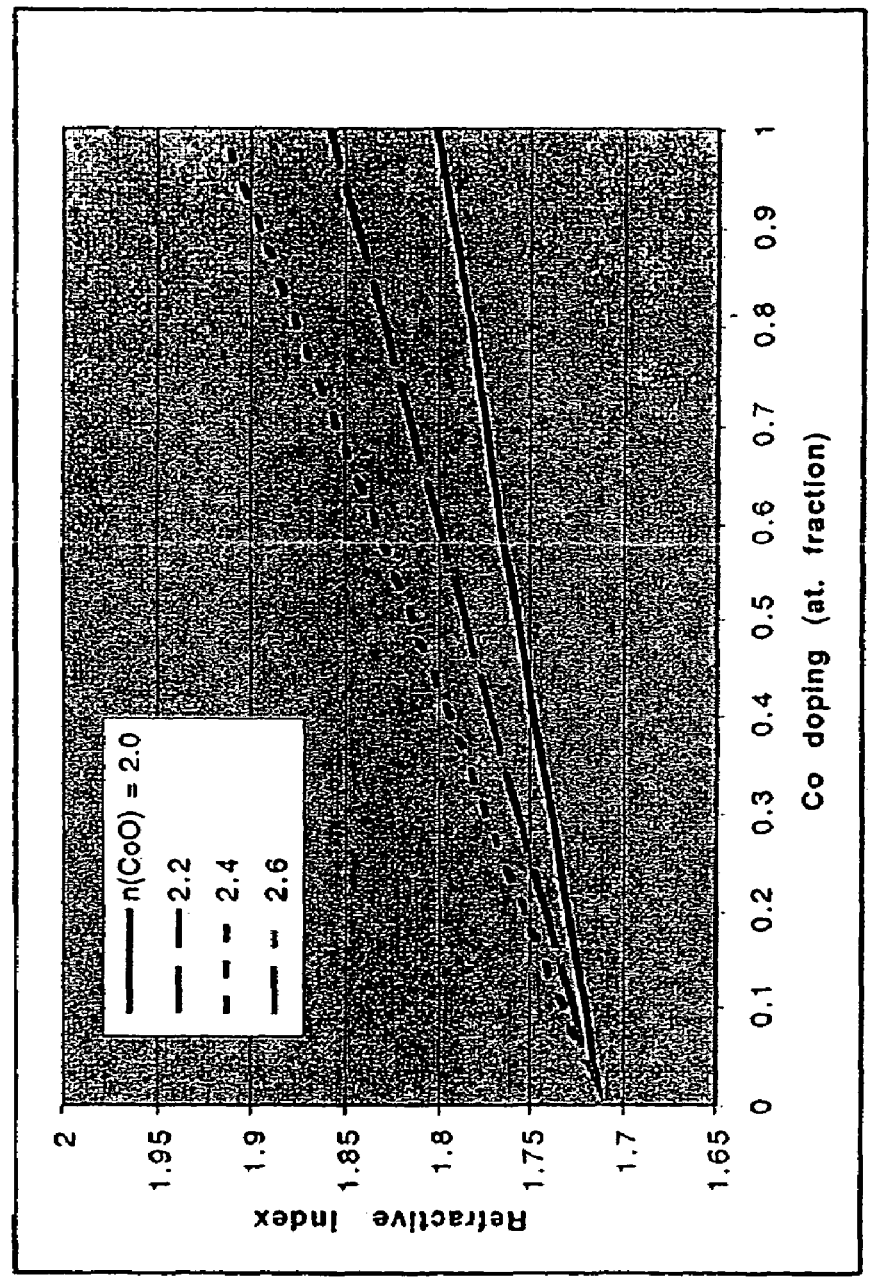
FIG. 7 depicts a calculated graph showing the relationship between refractive index and cobalt doped spinel for a range of refractive index values and an estimated density value of 6.45 gm/cc for CoO.

FIGS. 6 and 7 show plots of the calculated refractive index values as a function of Co-doping in spinel for a density value of 5.65 and 6.45 gm/cc, respectively. As can be seen from the two graphs, to obtain a refractive index of 1.8, the amount of doping varies between 30 at. % and 100 at. % depending on the density value and for the refractive index used. Although the calculated values differ somewhat from the extrapolated values in FIG. 5, the method does indicate that the addition of Co to spinel will increase the refractive index.

Figure 8:
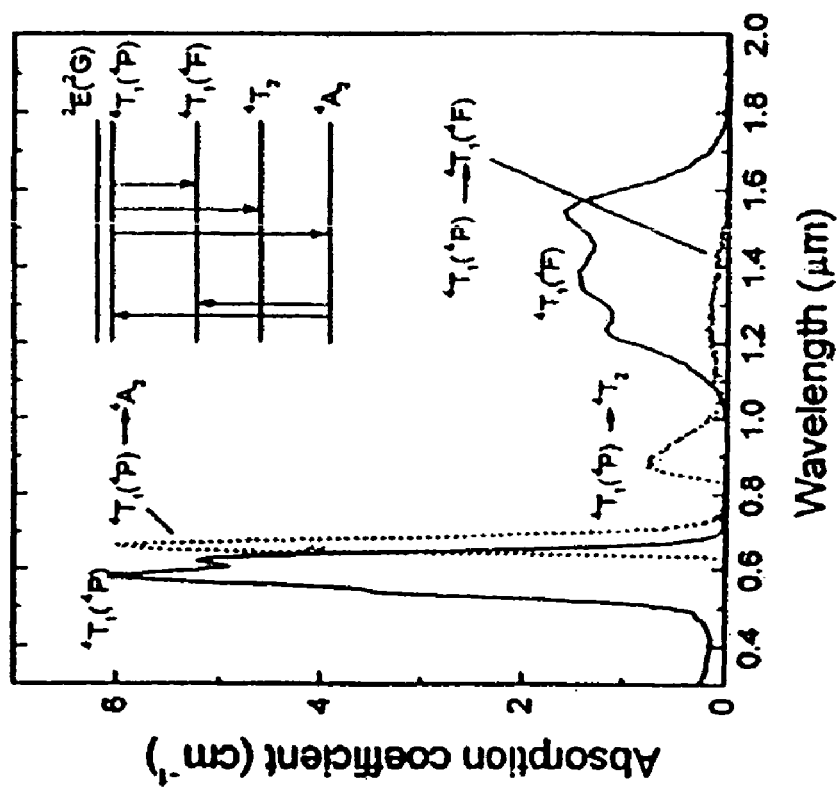
FIG. 8 depicts a graph showing the absorption spectrum of cobalt doped spinel from K. V. Yumashev, I. A. Denisov, N. N. Posnov, P. V. Prokoshin, and V. P. Mikhailov, "Nonlinear absorption properties of $Co^{2+}:MgAl_2O_4$," Appl. Phys. B, 70, 179-184 (2000).

The ability for a doped cladding material to suppress ASE can also be determined. Shown by the solid line in FIG. 8 is the absorption spectrum for cobalt-doped spinel at different wavelengths. The cobalt doping level in the spinel is 0.5 wt. % in the melt. However, given the reported volatility of cobalt in the spinel, the concentration within the spinel is most probably lower than the original level. Therefore, if an actual cobalt doping level of 1 at. % in the spinel is assumed, then the absorption coefficient at 1.03 µm is 0.06/cm. So given that the desired NA of 0.27 requires a doping of 10 at. % as discussed above, the absorption coefficient would be 0.6/cm. Assuming a nominal cladding thickness of 5 mm, then the round transmission is exp(−2al)=0.55, where a is the absorption coefficient, and l is the cladding thickness. This does not take into account other losses, but there will likely be Fresnel losses at the surface of the core 100. So practically speaking, the transmission value of 0.55 is the maximum upper bound limit. Hence, the roundtrip absorptive loss is 0.45 or ~3dB. Therefore, not only does cobalt modify the refractive index of spinel, but it will also absorb an appreciable amount of ASE at 1.03 µm. Thus when the cobalt doped spinel is used for the second cladding pair 106, the bulk ASE absorption will suppress additional ASE in the core 100 and parasitic oscillations beyond that which would have normally been suppressed with a doped material that did not absorb at 1.03 µm.

Other materials which may be doped and used as a cladding material in general include sapphire and ALON™ (Aluminum Oxynitride), however sapphire does have orientation issues as previously discussed. In the case of sapphire, the octahedral dopant site is occupied by the trivalent aluminum ion $Al^{3+}$(ionic radius of 0.535 Å, and coordinate number of VI). One possible candidate for that site on the basis of ionic size is $Co^{3+}$ with an ionic radius of 0.545 Å and coordinate number VI. However, the range of doping levels is yet to be determined, as well as the precise effect of changes in the refractive index as a function of doping. Nevertheless, it would appear that cobalt doping will increase the refractive index in sapphire as it does in spinel. In that case, cobalt doped sapphire would be a suitable method for tailoring the NA in the first cladding pair 104. This would also provide superior ASE suppression as compared with undoped sapphire. Regarding the suppression of ASE, the near-IR absorption of this dopant in sapphire is not currently known. Based on the 77K behavior of the reported visible absorption spectra from 14,000 $cm^{-1}$ to 34,000 $cm^{-1}$ as discussed in D. McClure, J. Chem. Phys., Vol. 36, p. 2757, 1962., one might infer that the NIR absorption at frequencies below 14,000 $cm^{-1}$ is quite low, however that assumption is highly speculative.

Another possible doped cladding material is ALON™. ALON™ is a polycrystalline isotropic material composed of Al, O, and N atoms. Because the lattice is polycrystalline, the ionic sites are not well defined like in a single-crystal host. Nevertheless, certain dopants may also be considered in order to modify the refractive index. The advantage of ALON™ is that it is cheaper to fabricate this material relative to sapphire, and can be grown in significantly larger sizes. Hence for certain applications where size and cost are important, ALON™ may be the cladding material of choice. Moreover, because it is isotropic, it satisfies the criterion for orientational compatibility with whatever composite design is chosen. Furthermore, the refractive index is already ~1.77 at a wavelength of 1 µm, so the possibility exists that a more modest substitutional doping level may be sufficient to enhance the refractive index and the NA appropriately.

From the foregoing description, it will be apparent that the present invention has a number of advantages, some of which have been described herein, and others of which are inherent in the embodiments of the invention described or claimed herein. Also, it will be understood that modifications can be made to the apparatus and method claimed herein without departing from the teachings of subject matter described herein. As such, the invention is not to be limited to the described embodiments except as required by the appended claims.

What is claimed is:

1. A method for optimizing a numerical aperture (NA) value of a laser active core comprising the steps of:
   providing the laser active core, the laser active core further comprising a first and second cladding pair and having a first NA value; and
   doping at least one of the first and second cladding pair, wherein the step of doping changes the first NA value to a desired second NA value.

2. The method of claim 1, wherein the step of doping further comprises the steps of:
   providing a dopant chemically compatible with a site symmetry, ionic number, and coordination number of at least one of the first and second cladding pair; and
   determining a doping concentration that will provide the desired second NA value.

3. The method of claim 1, wherein the first and second cladding pair are diffusion bonded to the laser active core and the laser active core has a first face and a second face.

4. The method of claim 3, wherein the step of providing the laser active core further comprises providing endcaps diffusion bonded across the first and second faces and across a portion of the first and second cladding pair planar with the first and second faces.

5. The method of claim 4, wherein the laser active core comprises 1% Yb:YAG.

6. The method of claim 1, wherein the first cladding pair comprises sapphire, and the second cladding pair comprises cobalt-doped spinel.

7. The method of claim 1, wherein the first and second cladding pair comprise a member selected from the group consisting of single crystals, polycrystals, and glasses.

8. The method of claim 4, wherein the endcaps comprise undoped YAG.

9. The method of claim 1, wherein the step of doping reduces the presence of amplified spontaneous emission in the laser active core.

10. The method of claim 1, further comprising the step of varying the second NA value by varying the dopant concentration during the step of doping.

11. The method of claim 9, wherein the dopant absorbs amplified spontaneous emission in at least one of the first and second cladding pair, thereby further reducing amplified spontaneous emission in the laser active core.

12. The method of claim 1, wherein the first cladding pair is in a heat flow path and the first cladding pair comprises a material having a thermal conductivity higher than material comprising the laser active core.

13. The method of claim 1, wherein at least one of the first and second cladding pair comprises crystalline material having a cubic structure.

14. A method for optimizing a numerical aperture (NA) value of a laser active core comprising the steps of:
providing the laser active core, wherein the laser active core further comprises:
a first and second cladding pair;
a first and second face, and
wherein the laser active core has a first NA value, and the first and second cladding pair are bonded to the laser active core, and
wherein the step of providing the laser active core further comprises the steps of:
providing endcaps diffusion bonded across the first and second faces and across the portion of the first and second cladding pair planar with the first and second faces; and
doping at least one of the first and second cladding pair with a dopant, wherein the step of doping changes the first NA value to a desired second NA value.

15. The method of claim 14, wherein the step of doping further comprises the steps of:
providing a dopant chemically compatible with a site symmetry, ionic number, and coordination number of at least one of the first and second cladding pair; and
determining a doping concentration that will provide the desired second NA value.

16. The method of claim 14, wherein the laser active core comprises 1% Yb:YAG.

17. The method of claim 14, wherein the first cladding pair comprises sapphire, and the second cladding pair comprises cobalt-doped spinel.

18. The method of claim 14, wherein the first and second cladding pair comprise a member selected from the group consisting of single crystals, polycrystals, and glasses.

19. The method of claim 14, wherein the endcaps comprise undoped YAG.

20. The method of claim 14, wherein the step of doping reduces the presence of amplified spontaneous emission in the laser active core.

21. The method of claim 14, further comprising the step of varying the second NA value by varying the dopant concentration during the step of doping.

22. The method of claim 20, wherein the dopant absorbs amplified spontaneous emission in at least one of the first and second cladding pair, thereby further reducing amplified spontaneous emission in the laser active core.

23. The method of claim 14, wherein the first cladding pair is in a heat flow path and the first cladding pair comprises a material having a thermal conductivity higher than material comprising the laser active core.

24. The method of claim 14, wherein at least one of the first and second cladding pair comprises crystalline material having a cubic structure.

25. A laser apparatus having an optimized numerical aperture (NA) value comprising:
a laser active core, the laser active core further comprising a first and second cladding pair and having a first NA value; and
a dopant introduced in at least one of the first and second cladding pair, wherein the dopant changes the first NA value to a desired second NA value.

26. The apparatus of claim 25, wherein the dopant is chemically compatible with a site symmetry, ionic number, and coordination number of at least one of the first and second cladding pair, and wherein the concentration of the dopant is selected so as to provide the desired second NA value.

27. The apparatus of claim 25, wherein the laser active core comprises a first and second face, and wherein the first and second cladding pair are diffusion bonded to the laser active core.

28. The apparatus of claim 27, wherein the laser active core further comprises endcaps diffusion bonded across the first and second faces and across a portion of the first and second cladding pair planar with the first and second faces.

29. The apparatus of claim 27, wherein the laser active core comprises 1% Yb:YAG.

30. The apparatus of claim 25, wherein the first cladding pair comprises sapphire, and the second cladding pair comprises cobalt-doped spinel.

31. The apparatus of claim 25, wherein the first and second cladding pair comprise a member selected from the group consisting of single crystals, polycrystals, and glasses.

32. The apparatus of claim 29, wherein the endcaps comprise undoped YAG.

33. The apparatus of claim 25, wherein the dopant reduces the presence of amplified spontaneous emission in the laser active core.

34. The apparatus of claim 25, wherein the second NA value is varied by varying the concentration of the dopant.

35. The apparatus of claim 33, wherein the dopant absorbs amplified spontaneous emission in at least one of the first and second cladding pair, thereby further reducing amplified spontaneous emission in the laser active core.

36. The apparatus of claim 25, wherein the first cladding pair is in a heat flow path and the first cladding pair comprises a material having a thermal conductivity higher than material comprising the laser active core.

37. The apparatus of claim 25, wherein at least one of the first and second cladding pair comprises crystalline material having a cubic structure.

38. A method for optimizing a numerical aperture (NA) value of a laser active core comprising the steps of:
providing the laser active core, the laser active core further comprising a first and second cladding pair and having a first NA value;
selecting a dopant; and
doping at least one of the first and second cladding pair with the dopant, wherein the step of doping changes the first NA value to a desired second NA value, and
wherein the step of selecting comprises the step of:
selecting a dopant which is chemically compatible with at least one parameter of the first and second cladding pair, and
wherein the step of doping comprises the step of:
determining a doping concentration that will provide the desired second NA value.

39. The method of claim 38, wherein the at least one parameter comprises a parameter selected from the group consisting of site symmetry, ionic number, and coordination number of at least one of the first and second cladding pair.

40. The method of claim 39, wherein the step of providing the laser active core further comprises providing a laser active core having a first and second face, wherein the first and second cladding pair are diffusion bonded to the laser active core.

41. The method of claim 40, wherein the step of providing the laser active core further comprises providing endcaps diffusion bonded across the first and second faces and across the portion of the first and second cladding pair planar with the first and second faces.

42. The method of claim 37, wherein the first and second cladding pair comprise a member selected from the group consisting of single crystals, polycrystals, and glasses.

43. The method of claim 40, wherein the step of doping reduces the presence of amplified spontaneous emission in the laser active core.

44. The method of claim 43, wherein the dopant absorbs amplified spontaneous emission in at least one of the first and second cladding pair, thereby further reducing amplified spontaneous emission in the laser active core.

45. The method of claim 38, wherein the first cladding pair is in a heat flow path and the first cladding pair comprises a material having a thermal conductivity higher than material comprising the laser active core.

46. The method of claim 38, wherein at least one of the first and second cladding pair comprises crystalline material having a cubic structure.

* * * * *